US012239229B2

(12) United States Patent
Alletto et al.

(10) Patent No.: US 12,239,229 B2
(45) Date of Patent: Mar. 4, 2025

(54) AMBIENT BED HAVING A HEAT RECLAIM SYSTEM

(71) Applicant: BEDGEAR, LLC, Farmingdale, NY (US)

(72) Inventors: Eugene Alletto, Glen Head, NY (US); Vandad Barzin Rad, Tacoma, WA (US)

(73) Assignee: Bedgear, LLC, Farmingdale, NY (US)

( * ) Notice: Subject to any disclaimer, the term of this patent is extended or adjusted under 35 U.S.C. 154(b) by 243 days.

(21) Appl. No.: 17/156,913

(22) Filed: Jan. 25, 2021

(65) Prior Publication Data

US 2021/0161300 A1 Jun. 3, 2021

Related U.S. Application Data

(63) Continuation of application No. 16/781,503, filed on Feb. 4, 2020, now Pat. No. 10,898,009, which is a (Continued)

(51) Int. Cl.
*A47C 21/04* (2006.01)
*A47C 27/00* (2006.01)
(Continued)

(52) U.S. Cl.
CPC .......... *A47C 21/044* (2013.01); *A47C 21/042* (2013.01); *A47C 21/048* (2013.01); (Continued)

(58) Field of Classification Search
CPC ................ A47C 21/048; A47C 21/044; A61G 7/05784; A61G 7/057
See application file for complete search history.

(56) References Cited

U.S. PATENT DOCUMENTS 2,371,788 A * 3/1945 Weeber ................ A47C 27/144 5/655.9
3,266,064 A * 8/1966 Figman ................ A47C 21/044 5/641

(Continued)

FOREIGN PATENT DOCUMENTS

JP S5697416 A 8/1981
JP H07-3403 U 1/1995

(Continued)

OTHER PUBLICATIONS

International Preliminary Report on Patentability PCT/US2015/011179 Form PCT/IB/273.

(Continued)

*Primary Examiner* — Eric J Kurilla
(74) *Attorney, Agent, or Firm* — Sorell, Lenna & Schmidt, LLP

(57) ABSTRACT

A bedding system is provided that includes a fan box layer having a plurality of ducts, each of the ducts being in communication with a fan configured to move air out of the duct and into an area surrounding the bedding system. A capacitor layer is positioned above the fan box layer. The capacitor layer includes a plurality of outlet ports, each of the outlet ports being in communication with one of the ducts. A mattress layer is positioned above the capacitor layer. The mattress layer includes a bottom portion having a plurality of first holes that are each in communication with at least one of the outlet ports and a top portion having a plurality of second holes that are each in communication with one of the first holes. The top portion defines a sleep surface.

20 Claims, 12 Drawing Sheets

Related U.S. Application Data continuation of application No. 15/974,093, filed on May 8, 2018, now Pat. No. 10,568,436, which is a continuation of application No. 15/789,346, filed on Oct. 20, 2017, now Pat. No. 10,104,982, which is a continuation of application No. 15/429,984, filed on Feb. 10, 2017, now Pat. No. 9,820,581, which is a continuation of application No. 14/595,537, filed on Jan. 13, 2015, now Pat. No. 9,756,952.

(60) Provisional application No. 61/926,526, filed on Jan. 13, 2014, provisional application No. 61/926,540, filed on Jan. 13, 2014.

(51) Int. Cl.
*A47C 27/14* (2006.01)
*A61G 7/057* (2006.01)

(52) U.S. Cl.
CPC .............. *A47C 27/00* (2013.01); *A47C 27/14* (2013.01); *A61G 7/05784* (2016.11)

(56) References Cited

U.S. PATENT DOCUMENTS

| | | | | |
|---|---|---|---|---|
| 3,818,522 A * | 6/1974 | Schuster | A47C 21/046 | 297/452.47 |
| 3,928,876 A * | 12/1975 | Starr | A47C 21/044 | 5/284 |
| 4,057,861 A * | 11/1977 | Howorth | A61G 7/057 | 5/423 |
| 4,825,488 A * | 5/1989 | Bedford | A61G 7/05784 | 5/736 |
| 4,866,800 A * | 9/1989 | Bedford | A61G 5/1043 | 5/736 |
| 4,939,804 A * | 7/1990 | Grant | A47C 21/044 | 5/423 |
| 5,058,227 A * | 10/1991 | Schoenfelder | A47C 21/044 | 261/119.1 |
| 5,226,188 A * | 7/1993 | Liou | A47C 7/742 | 5/653 |
| 5,305,483 A | 4/1994 | Watkins | | |
| 5,474,362 A * | 12/1995 | Albecker, III | A47C 7/46 | 297/452.32 |
| 5,546,618 A | 8/1996 | Beedy et al. | | |
| 5,730,120 A * | 3/1998 | Yonkers, Jr. | A47C 21/044 | 128/202.13 |
| 6,006,524 A * | 12/1999 | Park | A47C 21/048 | 62/3.5 |
| 6,148,457 A * | 11/2000 | Sul | A47C 21/048 | 5/284 |
| 6,363,551 B1 * | 4/2002 | Flores | A47C 21/048 | 5/423 |
| 6,484,340 B2 * | 11/2002 | Kutschi | A47C 21/046 | 5/724 |
| 6,581,225 B1 * | 6/2003 | Imai | A61G 7/05784 | 5/652.2 |
| 7,165,281 B2 | 1/2007 | Larsson et al. | | |
| 7,334,280 B1 * | 2/2008 | Swartzburg | A47C 21/046 | 5/724 |
| 7,588,291 B2 * | 9/2009 | Gold | A47D 5/00 | 297/452.47 |
| 7,631,377 B1 | 12/2009 | Sanford | | |
| 7,908,687 B2 | 3/2011 | Ward et al. | | |
| 7,908,688 B2 * | 3/2011 | Tompkins | F24F 9/00 | 454/192 |
| 7,913,332 B1 | 3/2011 | Barnhart | | |
| 8,065,763 B2 | 11/2011 | Brykalski et al. | | |
| 8,181,290 B2 | 5/2012 | Brykalski et al. | | |
| 8,332,975 B2 | 12/2012 | Brykalski et al. | | |
| 8,372,182 B2 | 2/2013 | Vrzalik et al. | | |
| 8,418,286 B2 | 4/2013 | Brykalski et al. | | |
| 8,881,328 B2 * | 11/2014 | Mikkelsen | A47C 21/044 | 5/652.2 |
| 2003/0019044 A1 | 1/2003 | Larsson et al. | | |
| 2003/0150060 A1 * | 8/2003 | Huang | A47C 21/044 | 5/726 |
| 2004/0237206 A1 * | 12/2004 | Webster | A47C 27/146 | 5/730 |
| 2004/0253920 A1 * | 12/2004 | Schoettle | A47C 21/044 | 454/907 |
| 2005/0278863 A1 * | 12/2005 | Bahash | A47C 21/044 | 5/652.2 |
| 2007/0136952 A1 | 6/2007 | Sargent | | |
| 2007/0261548 A1 | 11/2007 | Vrzalik et al. | | |
| 2008/0098529 A1 * | 5/2008 | Flocard | A47C 21/048 | 5/652.2 |
| 2008/0148481 A1 * | 6/2008 | Brykalski | A47C 21/048 | 5/423 |
| 2009/0064411 A1 * | 3/2009 | Marquette | F24H 9/2071 | 62/3.5 |
| 2010/0005588 A1 * | 1/2010 | Christopher | A47C 31/123 | 5/423 |
| 2010/0011502 A1 * | 1/2010 | Brykalski | A47C 21/04 | 5/423 |
| 2010/0274332 A1 * | 10/2010 | Hirakawa | A61F 7/10 | 607/114 |
| 2010/0325796 A1 * | 12/2010 | Lachenbruch | A61F 7/10 | 5/422 |
| 2011/0010850 A1 * | 1/2011 | Frias | A47C 21/048 | 5/423 |
| 2011/0041248 A1 * | 2/2011 | Kim | A61G 7/0573 | 5/604 |
| 2011/0067183 A1 * | 3/2011 | Hawkins | B32B 7/12 | 156/60 |
| 2011/0247143 A1 * | 10/2011 | Richards | A47C 27/10 | 417/313 |
| 2011/0258782 A1 * | 10/2011 | Call | A61G 5/1043 | 137/15.01 |
| 2011/0271447 A1 | 11/2011 | Theosabrata | | |
| 2011/0271448 A1 * | 11/2011 | Faridoon | A61G 7/05715 | 5/655.4 |
| 2011/0289684 A1 * | 12/2011 | Parish | A47C 21/044 | 5/421 |
| 2012/0017376 A1 | 1/2012 | Mikkelsen et al. | | |
| 2013/0205509 A1 * | 8/2013 | Chen | A47C 27/146 | 5/737 |
| 2013/0269106 A1 * | 10/2013 | Brykalski | A47C 7/744 | 5/423 |
| 2014/0033441 A1 * | 2/2014 | Morgan | A47C 31/006 | 5/724 |
| 2014/0182060 A1 * | 7/2014 | Mikkelsen | A47C 21/026 | 5/400 |
| 2014/0189951 A1 * | 7/2014 | DeFranks | A47C 27/05 | 5/423 |
| 2014/0201909 A1 * | 7/2014 | Weyl | A61G 7/05746 | 5/423 |
| 2015/0208815 A1 * | 7/2015 | Chandler | A47C 7/748 | 5/421 |
| 2015/0257540 A1 * | 9/2015 | Chandler | A47C 7/744 | 136/204 |
| 2015/0282631 A1 * | 10/2015 | Creamer | A47C 21/044 | 5/423 |
| 2015/0289666 A1 * | 10/2015 | Chandler | A47C 27/082 | 5/423 |
| 2015/0289667 A1 * | 10/2015 | Oakhill | A47C 27/18 | 5/423 |
| 2015/0296992 A1 * | 10/2015 | Ghanei | A47C 27/15 | 5/423 |
| 2015/0359357 A1 * | 12/2015 | Feng | A47C 27/006 | 53/436 |

FOREIGN PATENT DOCUMENTS

| | | |
|---|---|---|
| JP | H073403 A | 1/1995 |
| JP | 2007175476 A | 7/2007 |

(56) References Cited

FOREIGN PATENT DOCUMENTS

| | | | |
|---|---|---|---|
| JP | 2010201037 | A | 9/2010 |
| WO | 2012160502 | A1 | 11/2012 |
| WO | 2014204934 | A1 | 12/2014 |

OTHER PUBLICATIONS

International Search Report PCT/US2015/011179.
Written Opinion of the International Searching Authority (EPO) PCT/US2015/011179.
International Search Report and Written Opinion dated May 29, 2015 of International Application No. PCT/US2015/011179 filed Jan. 13, 2015.
Australian Government, IP Australia, http://www.ipaustralia.gov.au, Examination report No. 1 for standard patent application, Application No. 2020264306, Applicant name Bedgear, LLC, Dated Jul. 9, 2021.
Australian Government, IP Australia, http://www.ipaustralia.gov.au, Examination report No. 1 for standard patent application, Application No. 2020260552, Applicant name Bedgear, LLC, Dated Jul. 15, 2021.
Australian Search Report. Australian Application No. 2022205144: Oct. 20, 2023.
JP2007175476A—Google Patents English Translation.

* cited by examiner

AMBIENT BED HAVING A HEAT RECLAIM SYSTEM

This application is a continuation-in-part application of U.S. patent application Ser. No. 16/781,503, filed Feb. 4. 2020, which is a continuation of U.S. application Ser. No. 15/974,093, filed May 8, 2018, which issued as U.S. Pat. No. 10,568,436 and is a continuation application of U.S. patent application Ser. No. 15/789,346, filed Oct. 20, 2017, which issued as U.S. Pat. No. 10,104,982 and is a continuation application of U.S. patent application Ser. No. 15/429,984, filed Feb. 10, 2017, which issued as U.S. Pat. No. 9,820,581 and is a continuation application of U.S. patent application Ser. No. 14/595,537, filed Jan. 13, 2015, which issued as U.S. Pat. No. 9,756,952 and claims the benefit of U.S. application Ser. No. 61/926,526, filed Jan. 13, 2014, and U.S. application Ser. No. 61/926,540, filed Jan. 13, 2014.

TECHNICAL FIELD

The present disclosure generally relates to systems that include a temperature controlled bed system configured to draw ambient air away from a sleeping surface of a mattress. Methods of use are included.

BACKGROUND

Sleep is critical for people to feel and perform their best, in every aspect of their lives. Sleep is an essential path to better health and reaching personal goals. Indeed, sleep affects everything from the ability to commit new information to memory to weight gain. It is therefore essential for people to use bedding that suit both their personal sleep preference and body type in order to achieve comfortable, restful sleep.

Mattresses are an important aspect in achieving proper sleep. It is therefore beneficial to provide a mattress capable of maintaining a preselected temperature based on a user's sleep preference, so that the user achieves maximum comfort during sleep. It is desirable to provide a system which draws ambient air away from a sleeping surface of the mattress. It is also desirable to provide a temperature control system capable of being controlled to apply different temperature environments on different regions of the sleeping surface. This disclosure describes an improvement over these prior art technologies.

SUMMARY

In one embodiment, in accordance with the principles of the present disclosure, a bedding system is provided that includes a fan box layer having a plurality of ducts, each of the ducts being in communication with a fan configured to move air out of the duct and into an area surrounding the bedding system. A capacitor layer is positioned above the fan box layer. The capacitor layer includes a plurality of outlet ports, each of the outlet ports being in communication with one of the ducts. A mattress layer is positioned above the capacitor layer. The mattress layer includes a bottom portion having a plurality of first holes that are each in communication with at least one of the outlet ports and a top portion having a plurality of second holes that are each in communication with one of the first holes. The top portion defines a sleep surface.

BRIEF DESCRIPTION OF THE DRAWINGS

The present disclosure will become more readily apparent from the specific description accompanied by the following drawings, in which:

FIG. 4 is a perspective view of components of the system shown in

FIG. 1

FIG. 6 is a perspective view of components of the system shown in

FIG. 1;

FIG. 11 is a perspective view of a component of the system shown in

FIG. 1,

FIG. 12 is a top, detailed view of components of the system shown in

FIG. 1;

Like reference numerals indicate similar parts throughout the figures.

DETAILED DESCRIPTION

Figure 1:
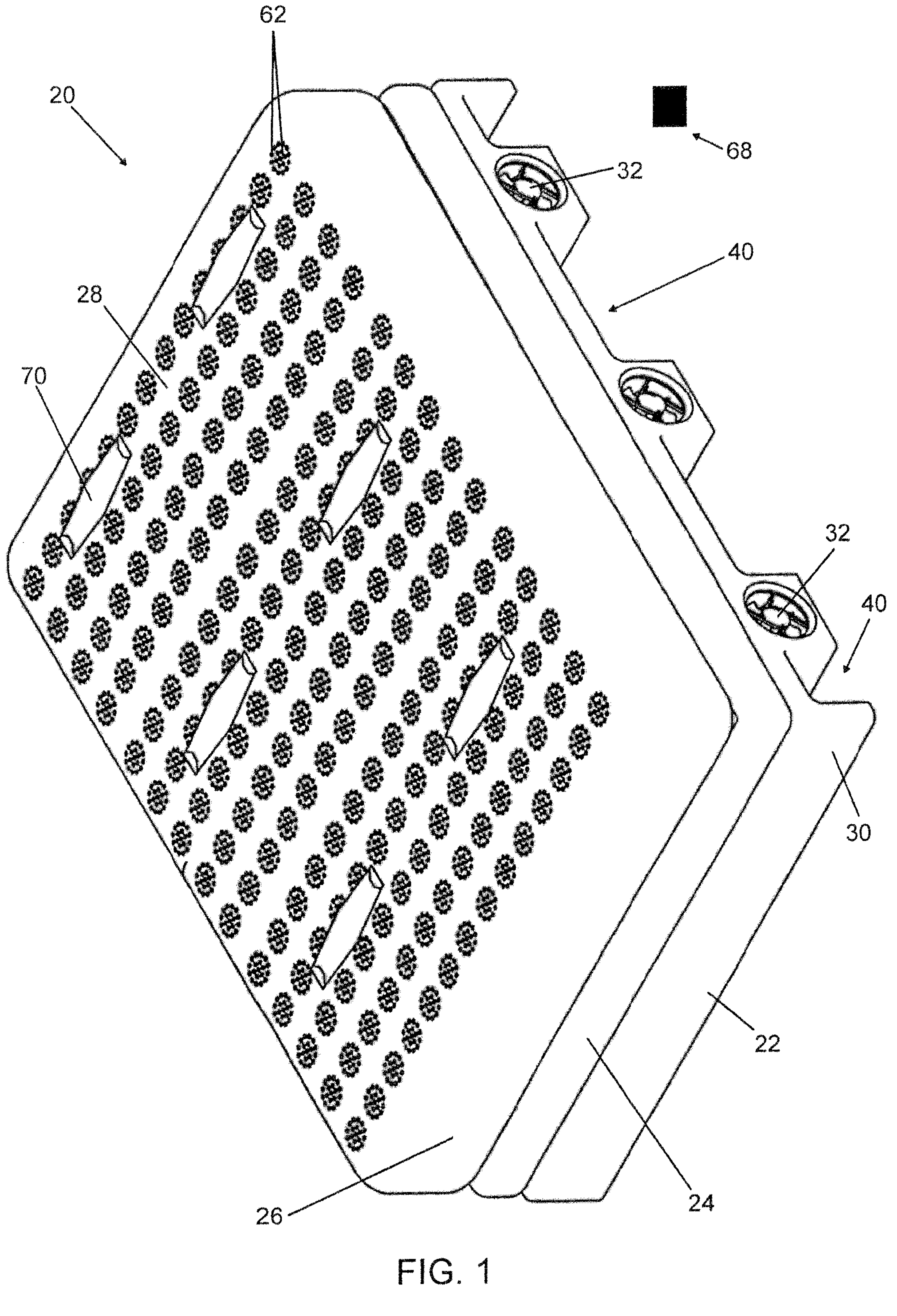
FIG. 1 is a perspective view of one embodiment of a bedding system in accordance with the principles of the present disclosure.
Figure 2:
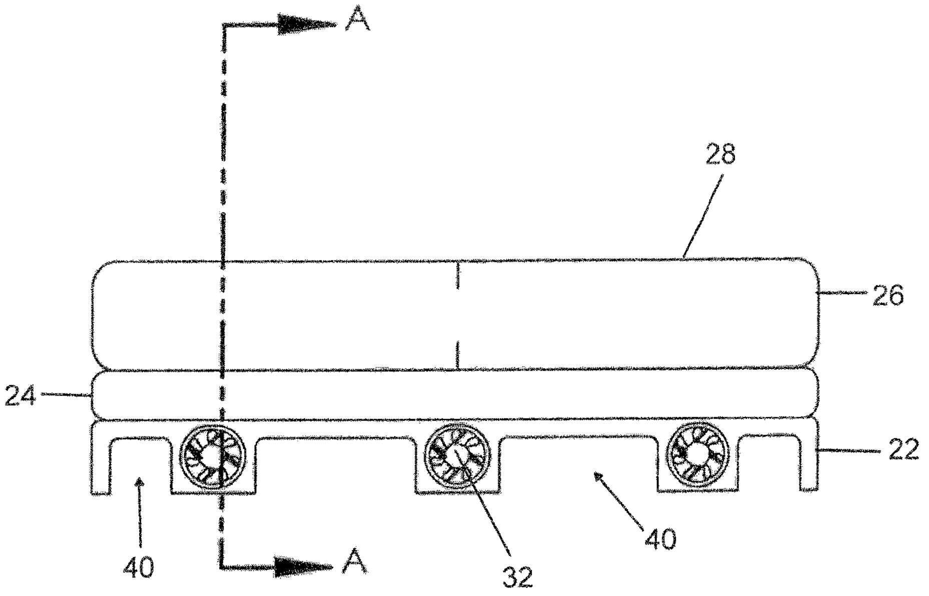
FIG. 2 is a side view of components of the system as shown in FIG. 1.

The exemplary embodiments of an ambient bed having a heat reclaim system and methods of use are discussed in terms of a bedding system that includes elements that enable air to be drawn away from a sleep surface of a mattress to regulate the temperature of the sleep surface. The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms “a,” “an,” and “the” include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of an ambient bed having a heat reclaim system, related components and methods of using the ambient bed system in accordance with the principles of the present disclosure. Alternate embodiments are also disclosed. Reference will now be made in detail to the exemplary embodiments of the present disclosure, which are illustrated in the accompanying figures. Turning to FIGS. 1-19, there are illustrated components of a bedding system 20.

The components of bedding 20 can be fabricated from materials including metals, polymers and/or composites, depending on the particular application. For example, the components of bedding system 20, individually or collectively, can be fabricated from materials such as fabrics or textiles, paper or cardboard, cellulosic-based materials, biodegradable materials, plastics and other polymers, metals, semi-rigid and rigid materials. Various components of bedding system 20 may have material composites, including the above materials, to achieve various desired characteristics such as strength, rigidity, elasticity, performance and durability. The components of bedding system 20, individually or collectively, may also be fabricated from a heterogeneous material such as a combination of two or more of the above-described materials. The components of bedding system 20 can be extruded, molded, injection molded, cast, pressed and/or machined. The components of bedding system 20 may be monolithically formed, integrally connected or include fastening elements and/or instruments, as described herein.

In one embodiment, shown in FIGS. 1-15, bedding system 20 includes a cooling member, for example a base or fan box layer 22, a spacer or capacitor layer 24 positioned above fan box layer 24 and a topper or mattress layer 26 positioned above capacitor layer 24. In one embodiment, the cooling member can be a Peltier device, Peltier heat pump, solid state refrigerator, or thermoelectric cooler (TEC). Capacitor layer 24 includes components to detect the temperature adjacent to a sleep surface 28 of mattress layer 26. If the temperature adjacent to sleep surface 28 deviates from a temperature selected by a user, capacitor layer 24 will heat or cool air within bedding system 20, which is exhausted from bedding system 20 by fan box layer 22 such that the heated or cooled air can change the temperature of the air adjacent to sleep surface 28 to the temperature selected by the user.

Figure 3:
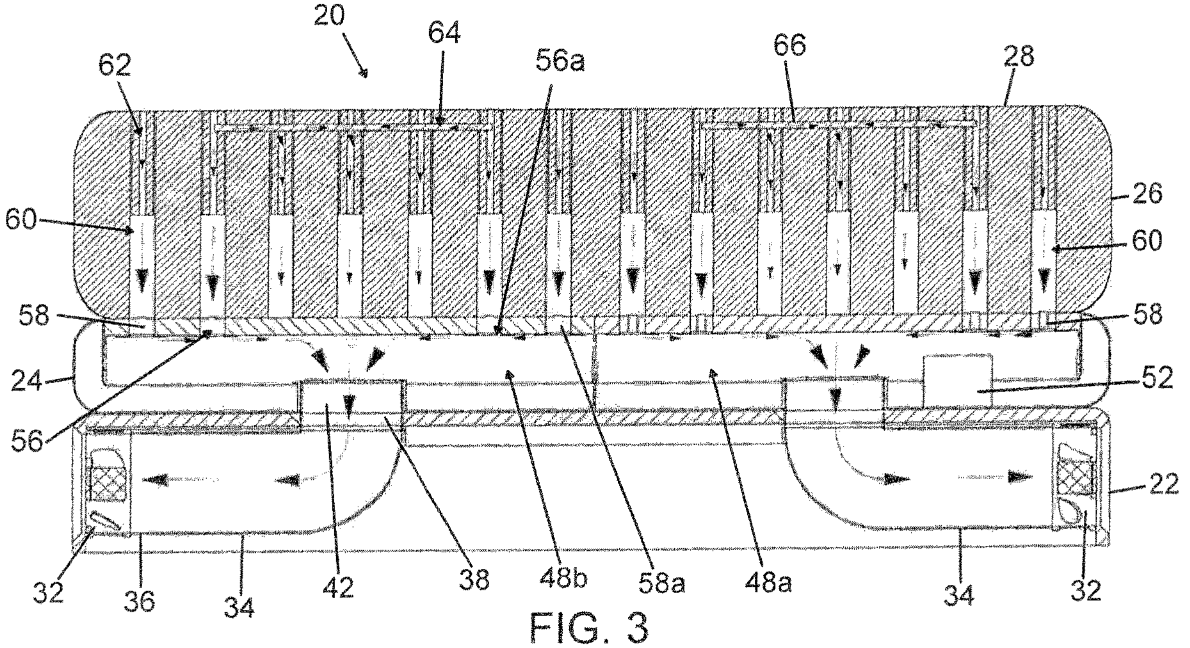
FIG. 3 is a cross-sectional view of components of the system shown in FIG. 1 taken along lines A-A in FIG. 2.
Figure 4:
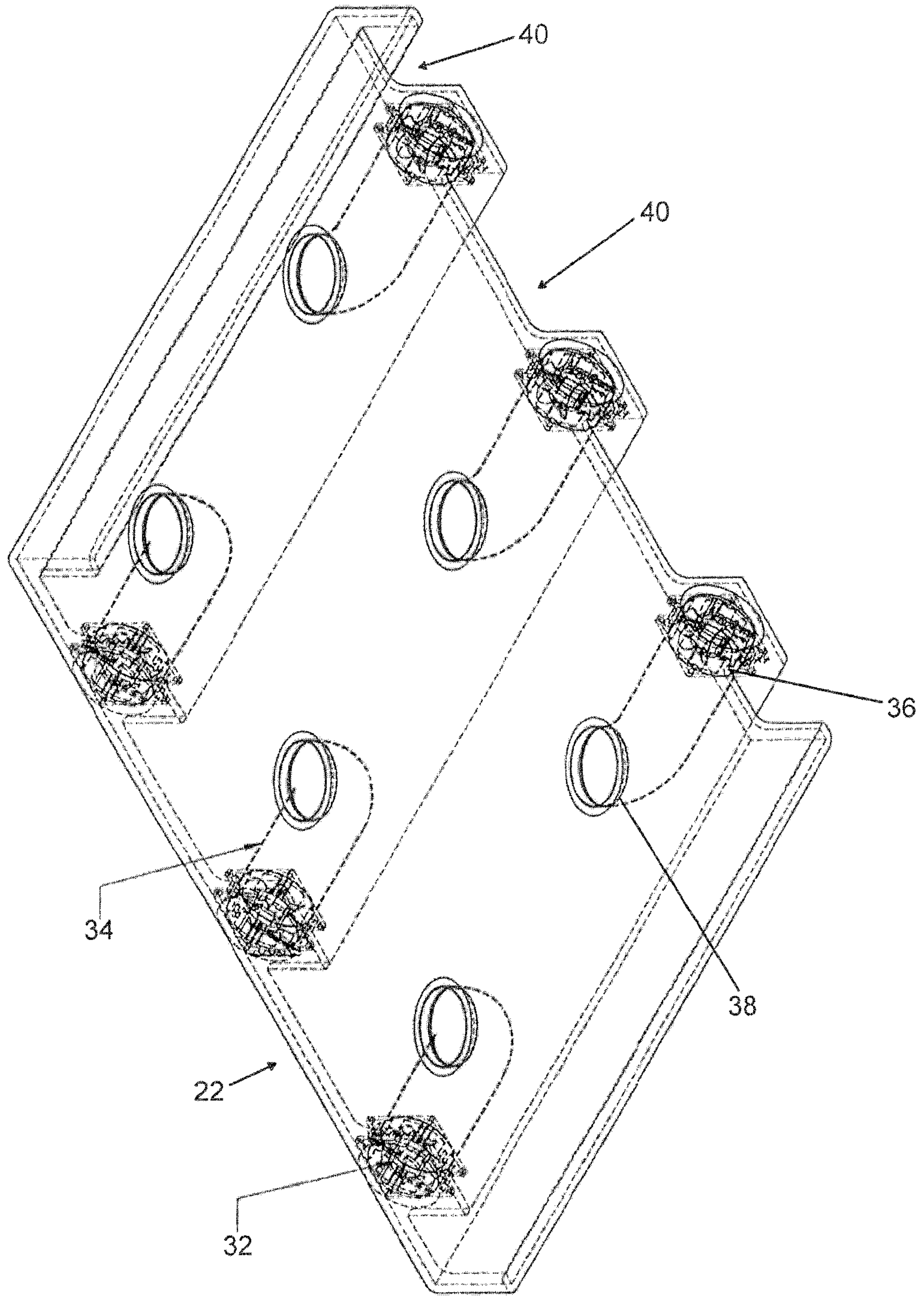

As shown in FIGS. 1-4, fan box layer 22 comprises a housing 30 configured to support, enclose and/or protect other components of fan box layer 22, such as, for example, a plurality of pressure generators, such as, for example, fans 32 and a plurality of ducts 34. In particular, housing 30 includes at least one of fans 32 within a wall on a first side of housing 30 and at least one of fans 32 within a wall on an opposite second side of housing 30, as shown in FIG. 4, for example. It is envisioned that fan box layer 22 and/or housing 30 can have any size or shape, depending upon the requirements of a particular application. For example, fan box layer 22 and/or housing 30 can be sized to substantially conform to the size and shape of a particular mattress, such as, for example, a twin mattress, a queen mattress, a king mattress, etc.

In one embodiment, the wall on the first side of housing 30 includes three fans 32 that are spaced apart from one another and the wall on the second side of housing 30 includes three fans 32 that are spaced apart from one another. However, it is envisioned that the wall on the first side of housing 30 and the wall on the second side of housing 30 may each include one or a plurality of fans 32. In one embodiment, each of fans 32 in the wall on the first side of housing 30 is aligned with one of fans 32 in the wall on the second side of housing 30, as shown in FIG. 4. Fans 32 are each coupled to one of ducts 34 such that an air channel defined by an inner surface of a respective one of ducts 34 is in communication with one of fans 32 such that fans 32 can each move air within the air channels of ducts 34 out of housing 30 and into an area surrounding bedding system 20, such as, for example, the ambient air surrounding bedding system 20. Ducts 34 each extend from a first end 36 that is coupled to one of fans 32 and an opposite second end 38. Ducts 34 each include an arcuate portion between first end 36 and second end 38 such that an opening in first end 36 extends perpendicular to an opening in second end 38, as shown in FIGS. 3 and 4, for example.

In one embodiment, housing 30 comprises a recess 40 between adjacent fans 32 and/or between fans 32 and top and bottom sides of housing 30 that extend between the first and second sides of housing 30, as shown in FIG. 1. In one embodiment, recesses 40 extend between and through the walls on the first and second sides of housing 30, as shown in FIG. 4, to permit air to move under housing 30 from the first side of housing 30 to the second side of housing 30. In one embodiment, housing 30 does not include recesses 40 and has a solid wall configuration in place of recesses 40 to prevent air from moving under housing 30.

Figure 5:
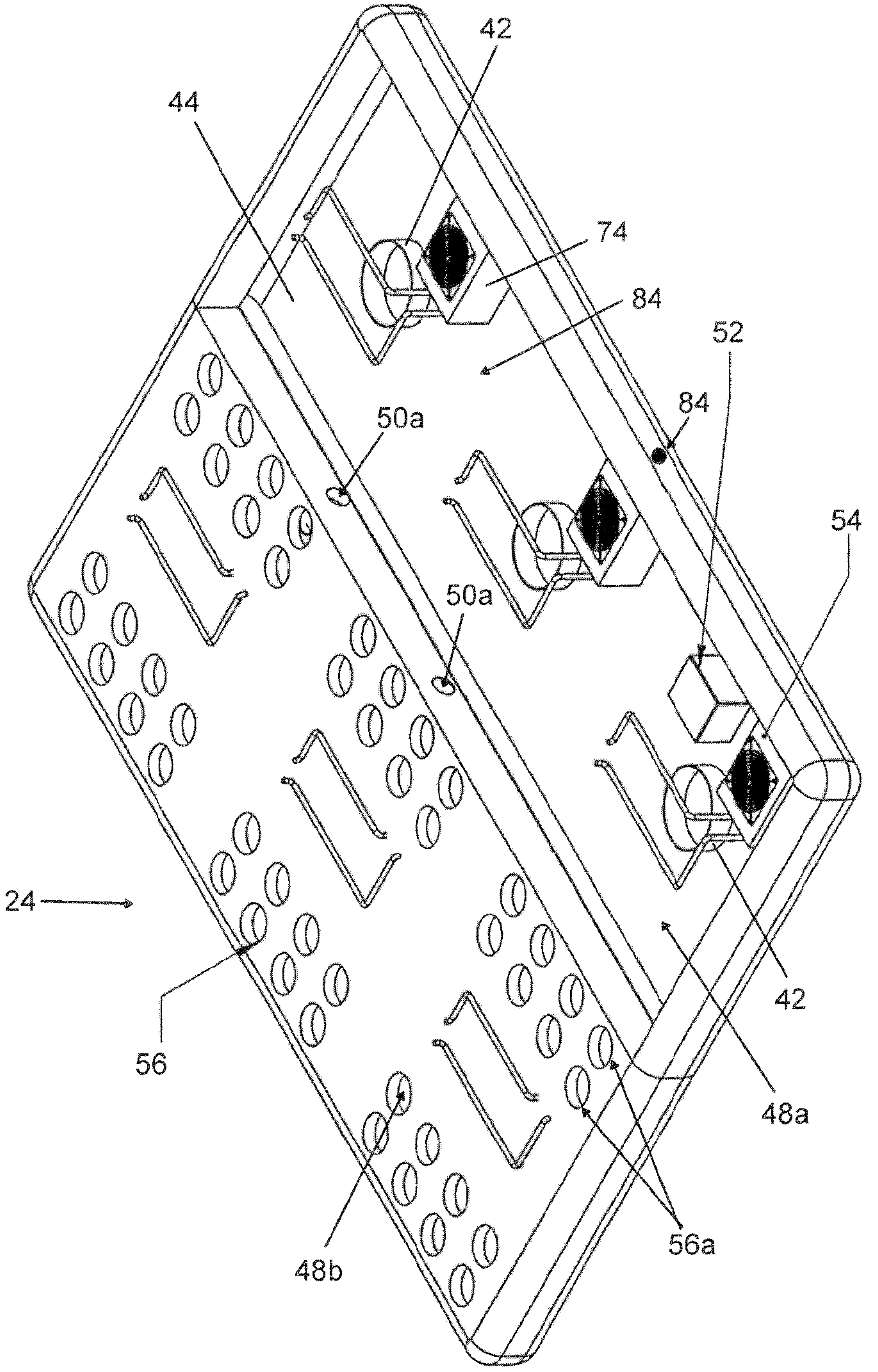
FIG. 5 is a perspective view, in part phantom, of components of the system shown in FIG. 1.

Capacitor layer 24 is positioned atop fan box layer 22 such that second ends 38 of ducts 34 are each coupled to an outlet port 42 of capacitor layer 24, as shown in FIG. 3, such that openings in outlet ports 42 are in communication with the openings in second ends 38 of ducts and the air channels of ducts 34. Outlet ports 42 extend upwardly from a bottom surface 44 of capacitor layer 24 and terminate prior to a top surface 46 of capacitor layer 24, as shown in FIG. 5. Top surface 46 and bottom surface 44 define a hollow compartment 48 therebetween. In one embodiment, compartment 48 is divided into a first section 48 a and a second section 48*b* by a wall 50, as shown in FIG. 5. In one embodiment, wall 50 includes one of a plurality of openings 50 a to allow air within first section 48 a to move into second section 48*b*, and vice versa. It is noted that a portion of top surface 46 that covers first section 48 a of compartment 48 has been removed in FIG. 5 in order to view the contents of first section 48*a*. In one embodiment, first section 48*a* is a mirror image of second section 48*b*. First section 48 a and second section 48*b* each include one or a plurality of system controllers 52 and one or a plurality of temperature regulator assemblies 54, which are discussed in greater detail hereinbelow. In some embodiments, a wall of capacitor layer 24 that defines bottom surface 44 is non-permeable.

Figure 6:
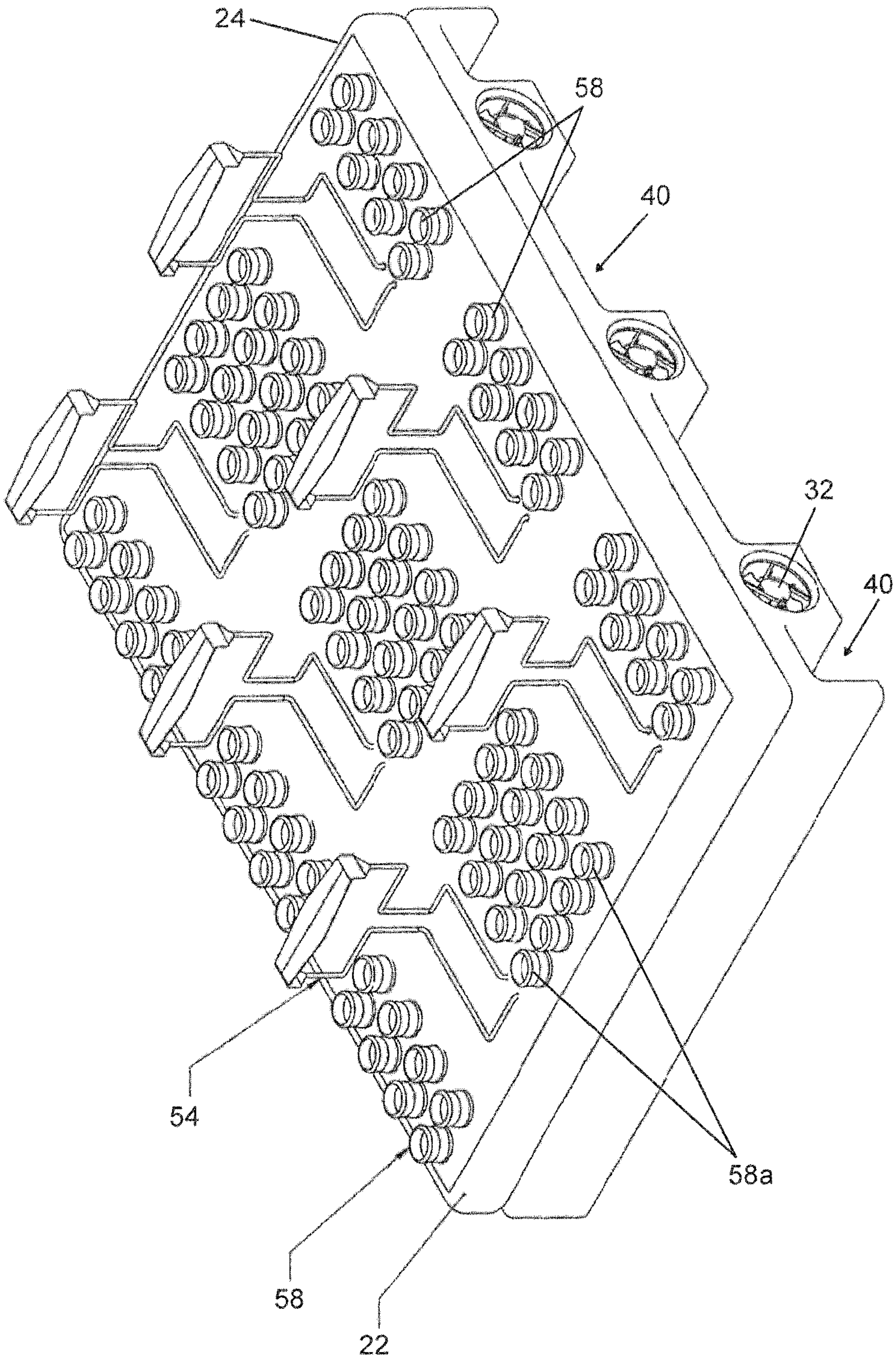
Figure 7:
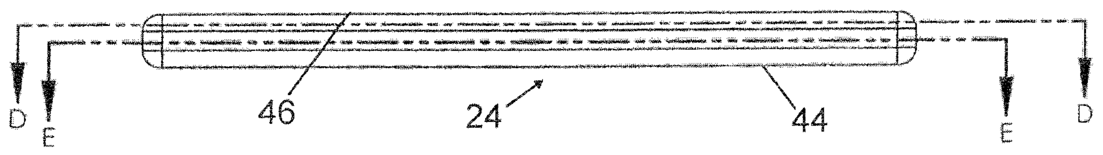
FIG. 7 is a side view of components of the system as shown in FIG. 1.
Figure 8:
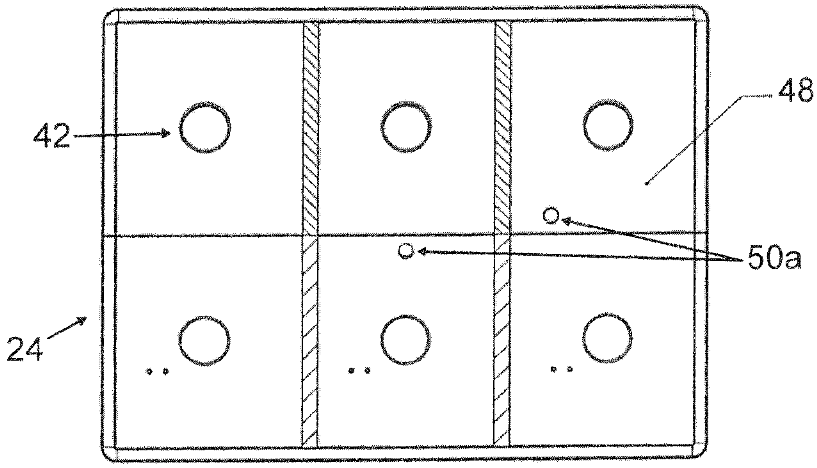
FIG. 8 is a cross-sectional view of components of the system shown in FIG. 1 taken along lines D-D in FIG. 7.
Figure 9:
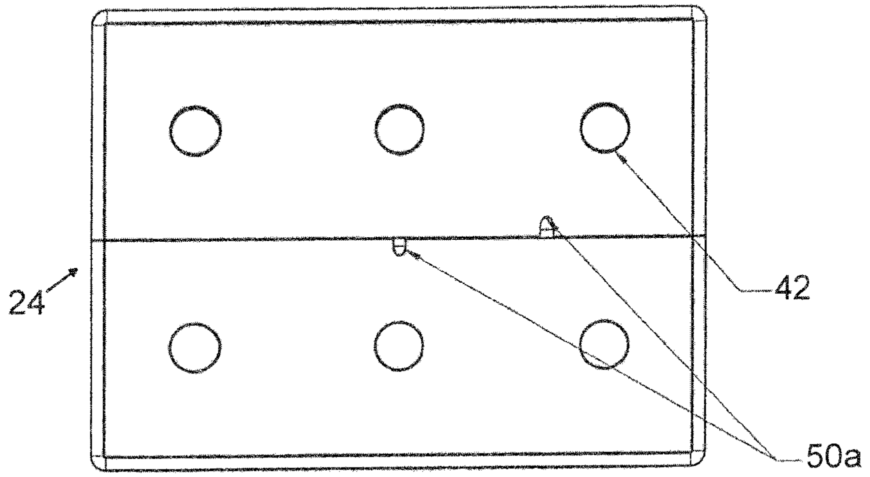
FIG. 9 is a cross-sectional view of components of the system shown in FIG. 1 taken along cross-sectional lines E-E in FIG. 7.

Top surface 46 of capacitor layer 24 includes a plurality of apertures 56 associated with each outlet port 42, as shown in FIG. 5. In one embodiment, shown in FIG. 5, top surface 46 includes eight apertures 56 for each outlet port 42. However, it is envisioned that top surface 46 may include one or a plurality of apertures 56 for each outlet port 42. Capacitor layer 24 includes a plurality of air flow aperture devices 58 extending upwardly from top surface 46 of capacitor layer 24, as shown in FIG. 6. Air flow aperture devices 58 are hollow and are each aligned with one of apertures 56. Each air flow aperture device 58 is aligned with one of apertures 56. In some embodiments, top surface 46 of capacitor layer 24 includes a plurality of apertures **56*a* positioned between aligned outlet ports 42, as shown in FIG. 5. It is envisioned that top surface 46 may include one or a plurality of apertures 56*a* positioned between each pair of aligned outlet ports 42. Capacitor layer 24 includes a plurality of air flow aperture devices 58*a* extending upwardly from top surface 46 of capacitor layer 24, as shown in FIG. 6. Air flow aperture devices 58*a* are hollow and are each aligned with one of apertures 56*a***.

Figure 12:
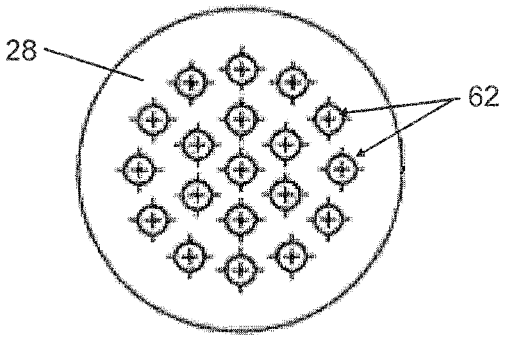

Mattress layer 26 is positioned atop capacitor layer 24 such that air flow aperture devices 58, **58*a* are aligned with first holes 60 that extend through a bottom surface of mattress layer 26. First holes 60 are in communication with one of apertures 56 and one of outlet ports 42 or are in communication with one of apertures 56*a*. Mattress layer 26 includes a plurality of sets of second holes 62, each set of second holes 62 being in communication with one of first holes 60. That is, each first hole 60 is in communication with a plurality of second holes 62 that each extend through sleep surface 28. First holes 60 each have a diameter that is greater than that of each of second holes 62 such that the holes in mattress layer 26 decrease in diameter and increase in quantity from the bottom surface of mattress layer 26 to sleep surface 28. First holes 60 each extend parallel to each of second holes 62. In one embodiment, at least one of second holes 62 is coaxial with a respective one of first holes 60 and at least one of second holes 62 is offset from a longitudinal axis defined by the respective one of first holes 60. In one embodiment, each set of second holes 62 has a circular configuration, as shown in FIG. 12 with one second hole 62 at the center of the set, a first ring of second holes 62 extending radially about the one second hole 62 and a second ring of second holes 62 extending radially about the first ring of second holes 62**.

Figure 13:
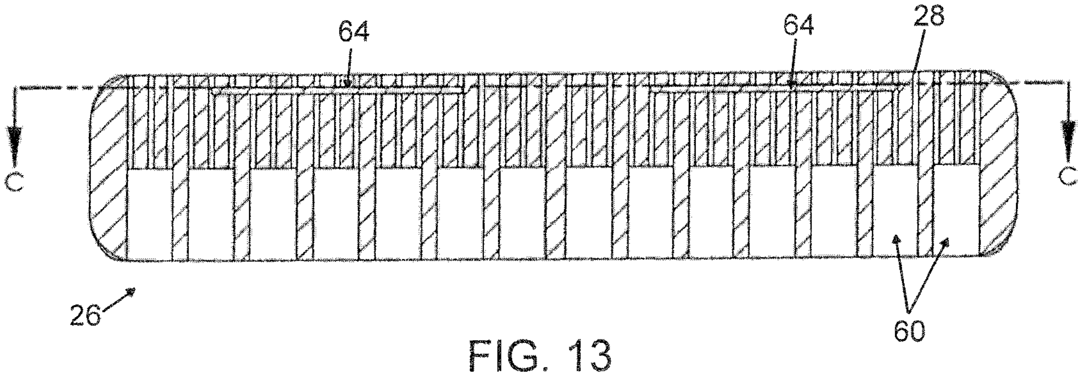
FIG. 13 is a cross-sectional view of components of the system shown in FIG. 1 taken along lines B-B in FIG. 15.
Figure 14:
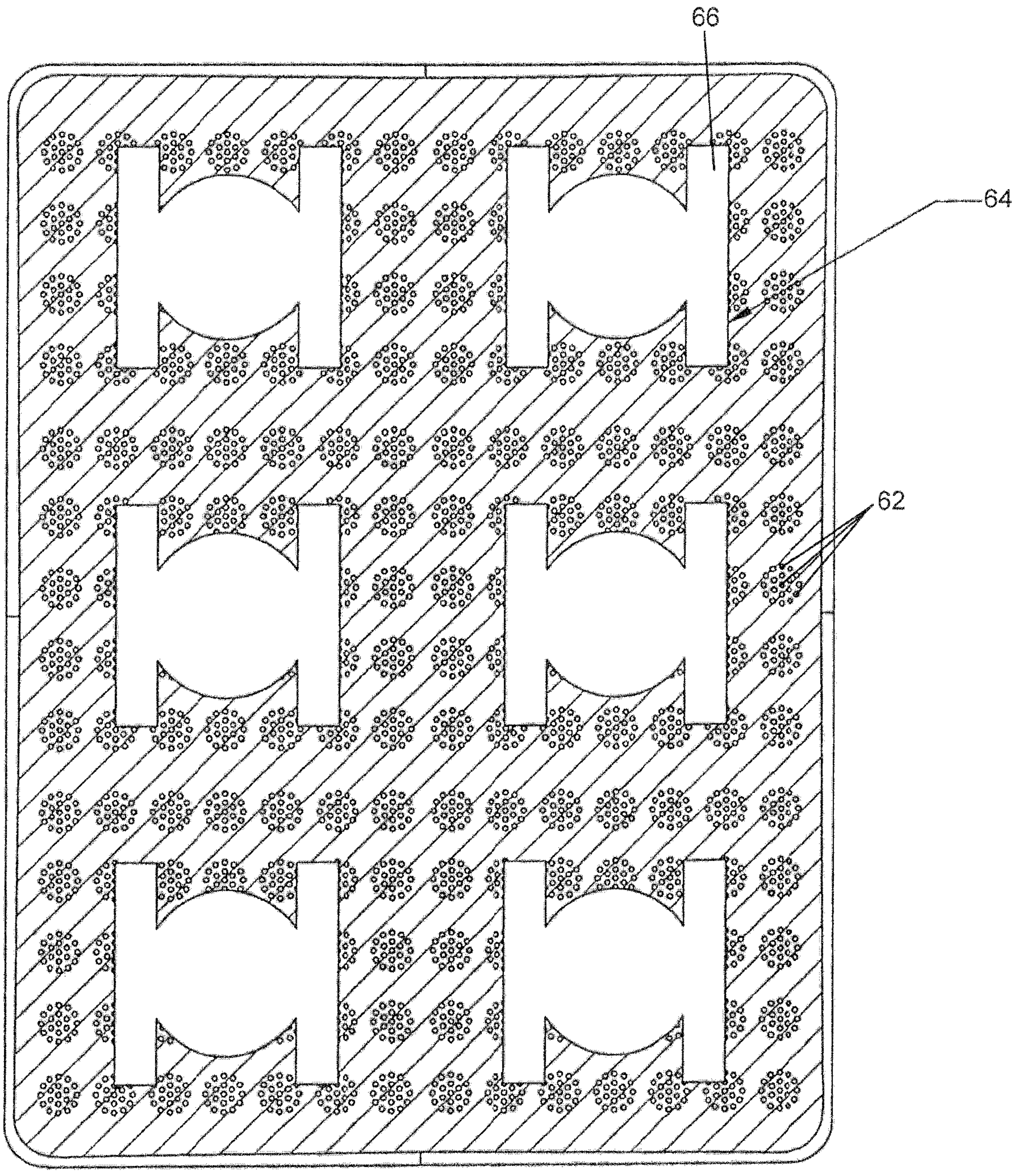
FIG. 14 is a cross-sectional view of components of the system shown in FIG. 1 taken along lines C-C in FIG. 13.
Figure 15:
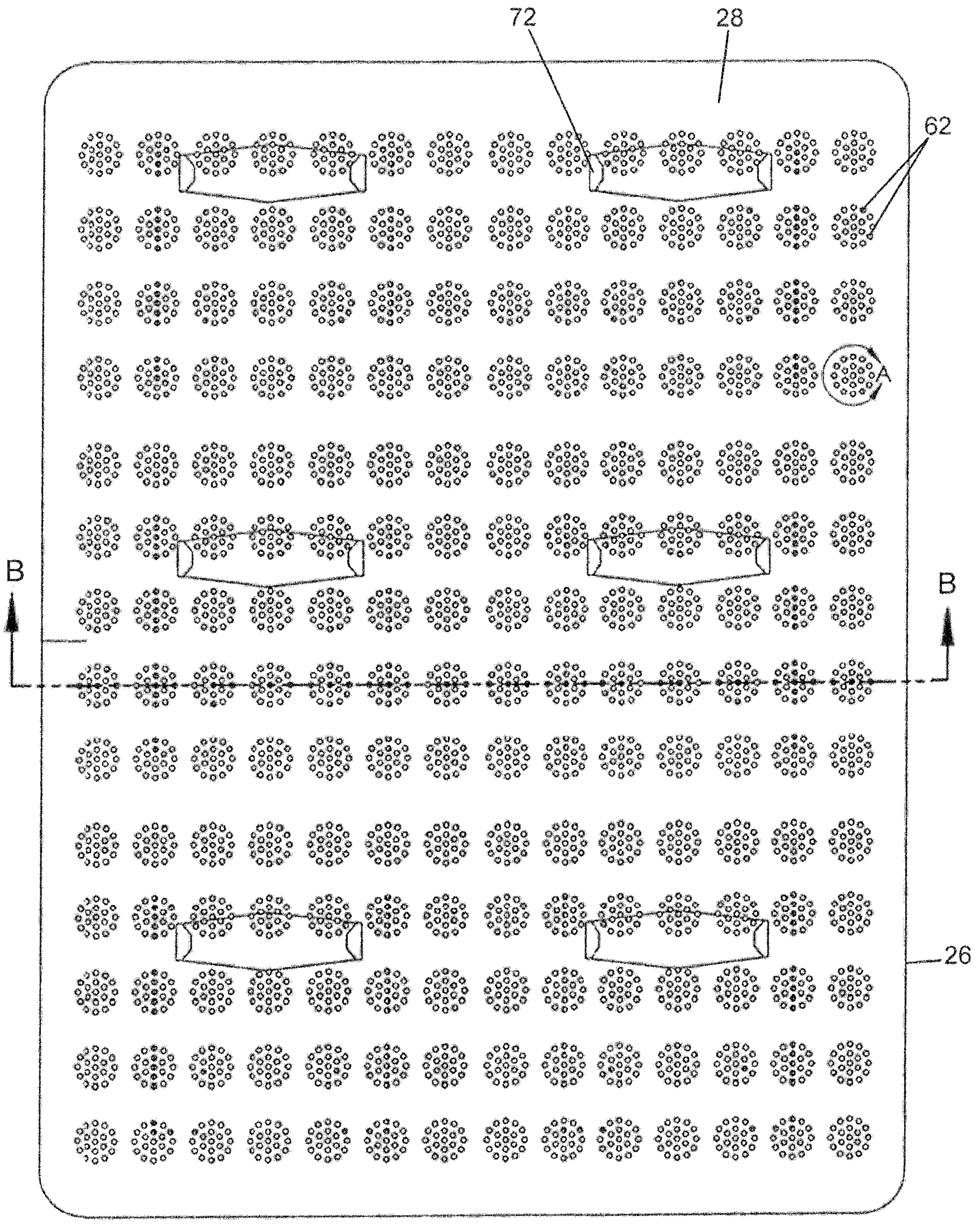
FIG. 15 is a top view of components of the system shown in FIG. 1.

Mattress layer 26 includes a plurality of cavities 64 extending perpendicular to second holes 62 such that cavities 64 each extend through a plurality of second holes 62, as shown in FIGS. 3, 13 and 14, for example. Each of cavities 64 is aligned with one of outlet ports 42. In one embodiment, cavities 64 each include opposite linear portions and an arcuate portion therebetween, as shown in FIG. 14. The linear portions at as a conduit/airflow channel portion and the round center or arcuate portion acts as a void space to draw from. In one embodiment, cavities 64 each have an insert 66 disposed therein, as shown in FIG. 14. In one embodiment, inserts 66 are made of foam, such as, for example, reticulated foam. In one embodiment, cavities 64 each extend perpendicular to each of second holes 62. In one embodiment, cavities 64 are positioned below sleep surface 28. In one embodiment, cavities 64 and inserts 66 are positioned to span across a plurality of sets of second holes 62 to provide an area will an ample size to draw air from sleep surface 38 into. Indeed, if cavities were too small or too few, it is likely that there would not be an ample area to draw air from sleep surface 38 into such that the amount of air from sleep surface 38 that enters second holes 62 would be reduced, even when fans 32 are on. Cavities 64 and inserts 66 allow air that moves perpendicular to sleep surface 28 within second holes 62 to move parallel to sleep surface 28 within cavities 64 and inserts 66. This, for example, allows air that is moving vertically within one of second holes 62 in a direction that moves away from sleep surface 28 to enter one of cavities 64 and inserts 66 and move laterally within the cavity 64 and insert 66 such that the air may continue to move vertically in a different one of second holes 62 in the direction that moves away from sleep surface 28. That is, cavities 64 and inserts 66 create a partially open cavity of space, which intersects a plurality of second holes 62 to allow the draw of air from cavities 64. The orientation of cavities 64 and inserts 66 in relation to the sleeper are configured to be positioned adjacent the sleeper's head, torso, and feet, as these areas of the body are most often affected by increases and decreases in temperature.

System controller 52 may include a printed circuit board and the sensors throughout the system that are constructed within the various components. System controller 52 may be connected to a module 68 by a wire or wirelessly such that a user can select a desired temperature for sleep surface 28 using module 68. The functions of system controller 52 and/or module 68 may be carried out by a processor, such as, for example, a computer processor. Temperature regulator assemblies 54 are connected to system controller 52 by a wire or wirelessly. Temperature regulator assemblies 54 extend into mattress layer 26 such that a soft flow channel 70 of each temperature regulator assembly 54 is positioned adjacent sleep surface 28. In one embodiment, soft flow channels 70 are flush with sleep surface 28. In one embodiment, soft flow channels 70 protrude at least slightly above sleep surface 28. In one embodiment, soft flow channels 70 are positioned at least slightly below sleep surface 28. In any event, soft flow channels 70 are positioned to bear at least part of the load of a sleeper who is lying upon sleep surface 28, while still enabling the flow of air across sleep surface 28.

Figure 10:
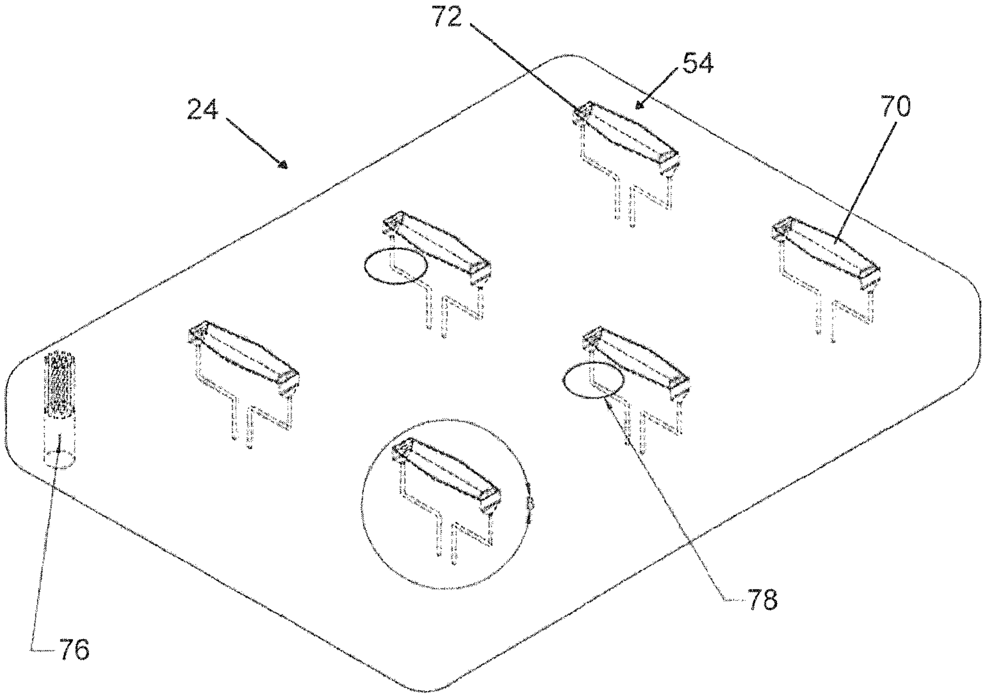
FIG. 10 is a perspective view, in part phantom, of components of the system shown in FIG. 1.
Figure 11:
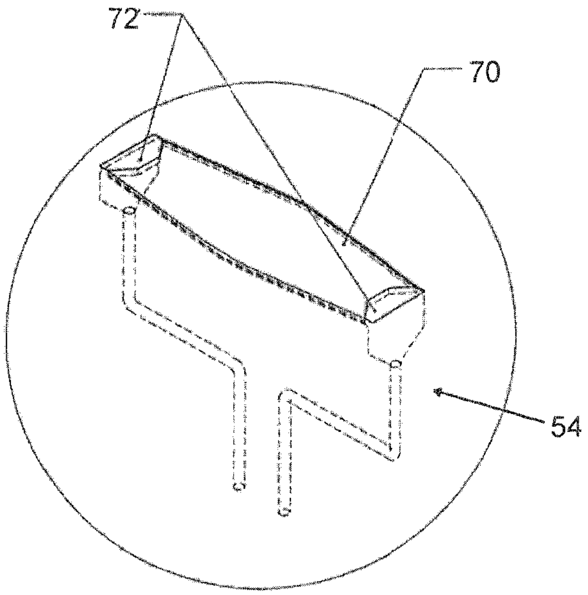

Temperature regulator assemblies 54 each include sensors 72. Sensors 72 may include temperature sensors, pressure sensors, moisture sensors, mass flow sensors, etc. Sensors 72 are configured to detect at least one characteristic of air within soft flow channels 70, such as, for example, temperature. Temperature regulator assemblies 54 each include a device configured to adjust the temperature of air within compartment 48, such as, for example, a thermoelectric device. In one embodiment, bedding system 20 includes a moisture sensor 76 that is separate from temperature regulator assemblies 54 and pressure sensors 78 that are integral with temperature regulator assemblies 54, as shown in FIG. 10. Likewise, bedding system 20 may include temperature sensors 80 and mass flow sensors 82 that are integral with temperature regulator assemblies 54, as shown in FIG. 11. In one embodiment, moisture sensor 76 is positioned in one of first holes 60 or second holes 62. The orientation of temperature regulator assemblies 54 and/or sensors 72 in relation to the sleeper are configured to be positioned adjacent the sleeper's head, torso, and feet. The biometric analysis algorithms are what drive the exact placement of sensors 72. Thus, this determines the placement of sensors 72 in various locations on sleep surface 28. In one embodiment, the electrical components that are included in the mattress construction are to run on 5 Volts or lower and be of the highest fire safety standards.

In one embodiment, bedding system 20 comprises pressure sensors positioned in the areas corresponding to the lower lumbar and hips of a sleeper as he or she lies upon mattress layer 26. There are two primary functions for the pressure sensor array within bedding system 20. The first is that it is used to indicate the presence of the sleeper. The second function of the pressure sensor array is to interpolate the lying direction, weight, and approximate size of the sleeper. The pressure sensor array directly interacts with a PID system controller and/or system controller 54. The pressure sensor array also allows for the potential use of intelligent comfort controls and features.

Sensors 72 may be used to detect whether the temperature of air within at least one of soft flow channels 70 is greater than, less than or equal to the temperature selected using module 68 and send a signal to system controller 52 indicating the same. If the temperature of air within one of soft flow channels 70 is greater than the temperature selected using module 68, system controller 52 will send a signal to temperature regulator assemblies 54 which causes thermoelectric devices 74 to alter air within compartment 48 such that the temperature of such air is less than or equal to the temperature selected using module 68. System controller 52 and/or temperature regulator assemblies 54 will send a signal to fans 32 causing fans to turn on and blow air out of compartment 48 and into the area surrounding bedding system 20. The negative pressure created as the air moves out of compartment 48 and into the area surrounding bedding system 20 will cause air at sleep surface 28 that has a temperature that is greater than the temperature selected using module 68 to move into second holes 62. The air will move from second holes 62 and into first holes 60. The air will move from first holes 60 and into outlet ports 42 such that the air moves through the air channels of ducts 34 and into the area surrounding bedding system 20. The air will change the ambient temperature in the area surrounding bedding system 20 over time.

Likewise, if the temperature of air within one of soft flow channels 70 is less than the temperature selected using module 68, system controller 52 will send a signal to temperature regulator assemblies 54 which causes thermoelectric devices 74 to alter air within compartment 48 such that the temperature of such air is greater than or equal to the temperature selected using module 68. System controller 52 and/or temperature regulator assemblies 54 will send a signal to fans 32 causing fans to turn on and blow air out of compartment 48 and into the area surrounding bedding system 20. The negative pressure created as the air moves out of compartment 48 and into the area surrounding bedding system 20 will cause air at sleep surface 28 that has a temperature that is less than the temperature selected using module 68 to move into second holes 62. The air will move from second holes 62 and into first holes 60. The air will move from first holes 60 and into outlet ports 42 such that the air moves through the air channels of ducts 34 and into the area surrounding bedding system 20. The air will change the ambient temperature in the area surrounding bedding system 20 over time.

In one embodiment, bedding system 20 may be configured to continuously draw air from sleep surface 28, alter the temperature of the air within bedding system 20 and then move the air into the area surrounding bedding system 20 continuously until sensors 72 detect that the air within soft flow channels 70 is equal to the temperature selected using module 68. That is, bedding system 20 will operate in the manner described in the preceding paragraphs until sensors 72 detect that air within soft flow channels 70 each have a temperature that is equal to the temperature selected using module 68. System controller 52 will then terminate the signal to temperature regulator assembly 54 that causes temperature regulator assembly 54 to turn thermoelectric device 74 on and/or the signal that causes fans 32 to turn on. Alternatively, system controller 52 can send a signal to temperature regulator assembly 54 that causes temperature regulator assembly 54 to turn thermoelectric device 74 off and/or a signal that causes fans 32 to turn off. There will be no signal between system controller 52 and temperature regulator assembly 54 unless and until sensors 72 detect that the temperature of air within at least one of soft flow channels 70 is greater or less than the temperature selected using module 68, at which point system controller 52 will provide the signals discussed above. The end result is to create and achieve an ambient equilibrium between the sleeper and his or her environment.

In one embodiment, first section **48*a* and a second section 48*b* of capacitor layer 24 each have a system controller 52 and a temperature regulator assembly 54 that can be controlled independently. That is, the system controller 52 and the temperature regulator assembly or assemblies 54 of first section 48*a* may be set and controlled independently from the system controller 52 and the temperature regulator assembly or assemblies 54 of second section 48*a* such that a portion of sleep surface 28 above first section 48*a* of capacitor layer 24 can be set to a temperature that is distinct from a portion of sleep surface 28 above second section 48*b* of capacitor layer 24. In one embodiment, this may be achieved by selecting a desired temperature for the portion of sleep surface 28 above first section 48*a*. Sensors 72 of the temperature regulator assembly or assemblies 54 of first section 48*a* may be used to detect whether the temperature of air within at least one of soft flow channels 70 of the temperature regulator assembly assemblies 54 of first section 48*a* is greater than, less than or equal to the temperature selected using module 68 and send a signal to system controller 52 of first section 48*a* indicating the same. If the temperature of air within one of soft flow channels 70 of first section 48*a* is greater than the temperature selected using module 68, system controller 52 of first section 48*a* will send a signal to temperature regulator assemblies 54 of first section 48*a* which causes thermoelectric devices 74 of first section 48*a* to alter air within compartment 48*a* such that the temperature of such air is less than or equal to the temperature selected using module 68. System controller 52 and/or temperature regulator assemblies 54 of first section 48*a* will send a signal to fans 32 in a portion of fan box layer 22 directly below first section 48*a* causing fans 32 to turn on and blow air out of compartment 48*a* and into the area surrounding bedding system 20. The negative pressure created as the air moves out of first section 48*a* of compartment 48 and into the area surrounding bedding system 20 will cause air at the portion of sleep surface 28 above first section 48*a* that has a temperature that is greater than the temperature selected using module 68 to move into second holes 62 of a portion of mattress layer 26 directly above first section 48*a*. The air will move from second holes 62 and into first holes 60 of the portion of mattress layer 26 directly above first section 48*a*. The air will move from first holes 60 of a portion of mattress layer 26 directly above first section 48*a* and into outlet ports 42 of first section 48*a* such that the air moves through the air channels of ducts 34 of the portion of fan box layer 22 directly below first section 48*a* and into the area surrounding bedding system 20. The air will change the ambient temperature in the area surrounding bedding system 20 over time. System 20 may also be used to decrease the temperature of the air adjacent sleep surface 28 above first section 48*a* if the temperature of air within one of soft flow channels 70 of first section 48*a* is less than the temperature selected using module 68** in the manner discussed above.

Likewise, to set the temperature of a portion of sleep surface directly above second section 48*b* of capacitor layer 24, a user selects a desired temperature for the portion of sleep surface 28 above second section 48*b*. Sensors 72 of the temperature regulator assembly or assemblies 54 of second section 48*b* may be used to detect whether the temperature of air within at least one of soft flow channels 70 of the temperature regulator assembly or assemblies 54 of second section 48*b* is greater than, less than or equal to the temperature selected using module 68 and send a signal to system controller 52 of second section 48*b* indicating the same. If the temperature of air within one of soft flow channels 70 of second section 48*b* is greater than the temperature selected using module 68, system controller 52 of second section 48*b* will send a signal to temperature regulator assemblies 54 of second section 48*b* which causes thermoelectric devices 74 of second section 48*b* to alter air within compartment 48 such that the temperature of such air is less than or equal to the temperature selected using module 68. System controller 52 and/or temperature regulator assemblies 54 of second section 48*b* will send a signal to fans 32 in a portion of fan box layer 22 directly below second section 48*b* causing fans 32 to turn on and blow air out of compartment 48*b* and into the area surrounding bedding system 20. The negative pressure created as the air moves out of second section 48*b* of compartment 48 and into the area surrounding bedding system 20 will cause air at the portion of sleep surface 28 above second section 48*b* that has a temperature that is greater than the temperature selected using module 68 to move into second holes 62 of a portion of mattress layer 26 directly above second section 48*b*. The air will move from second holes 62 and into first holes 60 of the portion of mattress layer 26 directly above second section 48*b*. The air will move from first holes 60 of a portion of mattress layer 26 directly above second section 48*b* and into outlet ports 42 of first section 48*a* such that the air moves through the air channels of ducts 34 of the portion of fan box layer 22 directly below second section 48*b* and into the area surrounding bedding system 20. The air will change the ambient temperature in the area surrounding bedding system 20 over time. System 20 may also be used to decrease the temperature of the air adjacent sleep surface 28 above second section 48*b* if the temperature of air within one of soft flow channels 70 of second section 48*b* is less than the temperature selected using module 68 in the manner discussed above.

When a thermoelectric device is in cooling mode it must exhaust hot air and when it is in heating mode it must exhaust cool air. As such, in one embodiment, thermoelectric device(s) 74 of temperature regulator assembly or assemblies 54 of first section 48*a* of capacitor layer 24 are configured to exchange air with thermoelectric device(s) 74 of temperature regulator assembly assemblies 54 of second section 48*b* of capacitor layer 24. This may improve the efficiency of bedding system 20 by limiting the amount of work required by thermoelectric devices 74 to alter the temperature within first section 48*a* or second section of compartment 48 of capacitor layer 24. In one embodiment, air in first section 48*a* may be exchanged with air in second section 48*b* through openings 50*a* in wall 50 of fan box layer 22. Such a configuration acts as a heat reclaim system that feeds hot air into second section 48*b* of compartment 48 when a sleeper above first section 48*a* of compartment 48 is being cooled and a sleeper above second section 48*b* is being warmed. Conversely, the cold air that is produced by thermoelectric device 74 in second section 48*b* that is warming the sleeper will be sent to first section 48*a*, which includes the thermoelectric device 74 that is cooling the sleeper.

In one embodiment of the heat reclaim system, when thermoelectric device(s) 74 of temperature regulator assembly or assemblies 54 of first section 48*a* receive a signal to increase the temperature adjacent sleep surface 28 above first section 48*a*, thermoelectric device(s) 74 of temperature regulator assembly or assemblies 54 of first section 48*a* may exhaust cool air when creating hot air in order to return the temperature adjacent sleep surface 28 above first section 48*a* to a selected temperature. The cool air may then be used by thermoelectric device(s) 74 of temperature regulator assembly or assemblies 54 of second section 48*b* to cool air adjacent sleep surface 28 above second section 48*b* in order to decrease the temperature adjacent sleep surface 28 above second section 48*b*. This allows air from one side of system 20 to be "reclaimed" and utilized by an opposite side of system 20 to improve the efficiency thereof. In the same manner, thermoelectric device(s) 74 of temperature regulator assembly or assemblies 54 of second section 48*b* may exhaust cool air when creating hot air in order to return the temperature adjacent sleep surface 28 above second section 48*b* to a selected temperature. The cool air may then be used by thermoelectric device(s) 74 of temperature regulator assembly or assemblies 54 of first section 48*a* to cool air adjacent sleep surface 28 above first section 48*a* in order to decrease the temperature adjacent sleep surface 28 above first section 48*a*.

Likewise, when thermoelectric device(s) 74 of temperature regulator assembly or assemblies 54 of first section 48*a* receive a signal to decrease the temperature adjacent sleep surface 28 above first section 48*a*, thermoelectric device(s) 74 of temperature regulator assembly or assemblies 54 of first section 48*a* may exhaust hot air when creating cool air in order to return the temperature adjacent sleep surface 28 above first section 48*a* to a selected temperature. The hot air may then be used by thermoelectric device(s) 74 of temperature regulator assembly or assemblies 54 of second section 48*b* to heat air adjacent sleep surface 28 above second section 48*b* in order to increase the temperature adjacent sleep surface 28 above second section 48*b*. This allows air from one side of system 20 to be "reclaimed" and utilized by an opposite side of system 20 to improve the efficiency thereof. In the same manner, thermoelectric device(s) 74 of temperature regulator assembly or assemblies 54 of second section 48*b* may exhaust hot air when creating cool air in order to return the temperature adjacent sleep surface 28 above second section 48*b* to a selected temperature. The hot air may then be used by thermoelectric device(s) 74 of temperature regulator assembly or assemblies 54 of first section 48*a* to heat air adjacent sleep surface 28 above first section 48*a* in order to increase the temperature adjacent sleep surface 28 above first section 48*a*. Thermoelectric device(s) 74 can be, for example, an instrument is also called a Peltier device Peltier heat pump, solid state refrigerator, or thermoelectric cooler (TEC).

In one embodiment, thermoelectric device(s) in first section 48*a* of compartment 48 of capacitor layer 24 and thermoelectric device(s) in second section 48*b* of compartment 48 of capacitor layer 24 include an outlet or exhaust 84 to exhaust air outside of capacitor layer 24 such that when thermoelectric device(s) in first section 48*a* or thermoelectric device(s) in second section 48*b* are producing hot air (to increase the temperature of air adjacent sleep surface 28), the cool air that is exhausted from thermoelectric device(s) in first section 48*a* or thermoelectric device(s) in second section 48*b* is not contained within compartment 48. Rather the cool air is exhausted outside of capacitor layer 24. Likewise, when thermoelectric device(s) in first section 48*a* or thermoelectric device(s) in second section 48*b* are producing cool air (to decrease the temperature of air adjacent sleep surface 28), the hot air that is exhausted from thermoelectric device(s) in first section 48*a* or thermoelectric device(s) in second section 48*b* is not contained within compartment 48. Rather the hot air is exhausted outside of capacitor layer 24. This allows thermoelectric device(s) in first section 48*a* to cool air adjacent sleep surface 28 above first section 48*a* at the same time thermoelectric device(s) in second section 48*b* cools air adjacent sleep surface 28 above second section 48*b* or thermoelectric device(s) in first section 48*a* to heat air adjacent sleep surface 28 above first section 48*a* at the same time thermoelectric device(s) in second section 48*b* heats air adjacent sleep surface 28 above second section 48*b*.

In one embodiment, shown in FIGS. 16-19, bedding system 20 is configured to direct conditioned air adjacent to sleep surface 28, rather than direct the conditioned air to the area surrounding bedding system 20, such as, for example, the room in which bedding system 20 is positioned, as was the case for the embodiment show in FIGS. 1-15. That is, in the embodiment shown in FIGS. 16-18, the conditioned air is directed to sleep surface 28 (or an area adjacent to sleep surface 28) to adjust the temperature of sleep surface 28, rather than adjust the temperature of the air in the room bedding system 20 is positioned. It is envisioned that this configuration will allow the temperature of sleep surface 28 to be adjusted more rapidly than would occur when the temperature of the air in the room bedding system 20 is adjusted. Accordingly, bedding system 20 includes at least one airflow post 86 coupled to fan box layer 22 such that conditioned air from one of fans 32 may be directed into airflow post 86 such that the conditioned air can exit airflow post 86 adjacent to sleep surface 28. In one embodiment, bedding system 20 includes an airflow post 86 coupled to fan box layer 22 adjacent each of fans 32. That is, each fan 32 will be coupled to one of air flow posts 86 such that conditioned air from each of fans 32 will be directed into one of air flow posts 86 such that the conditioned air can exit airflow posts 86 adjacent to sleep surface 28. In one embodiment, airflow posts 86 each include a first portion 86*a* extending parallel to sleep surface 28, a second portion 86*b* extending perpendicular to sleep surface 28 and a third portion 86*c* extending parallel to sleep surface 28. An inner surface of airflow post 86 defines a passageway 88 that is continuous through portions 86*a*, 86*b*, 86*c*.

Figure 16:
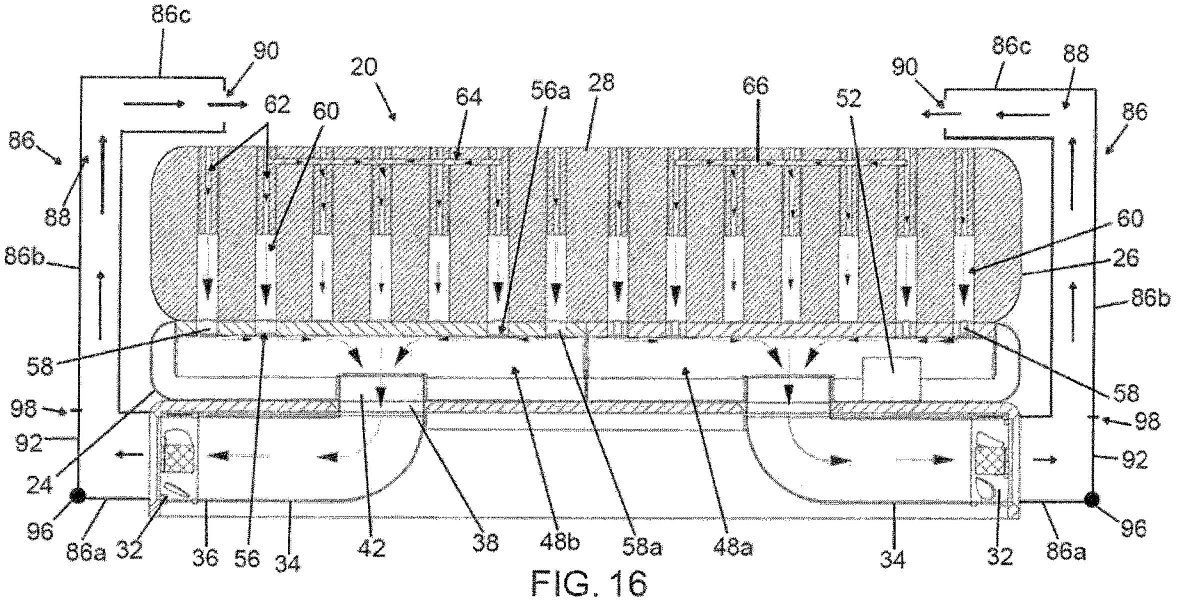
FIG. 16 is a cross-sectional view of components of one embodiment of the system shown in FIG. 1.
Figure 17:
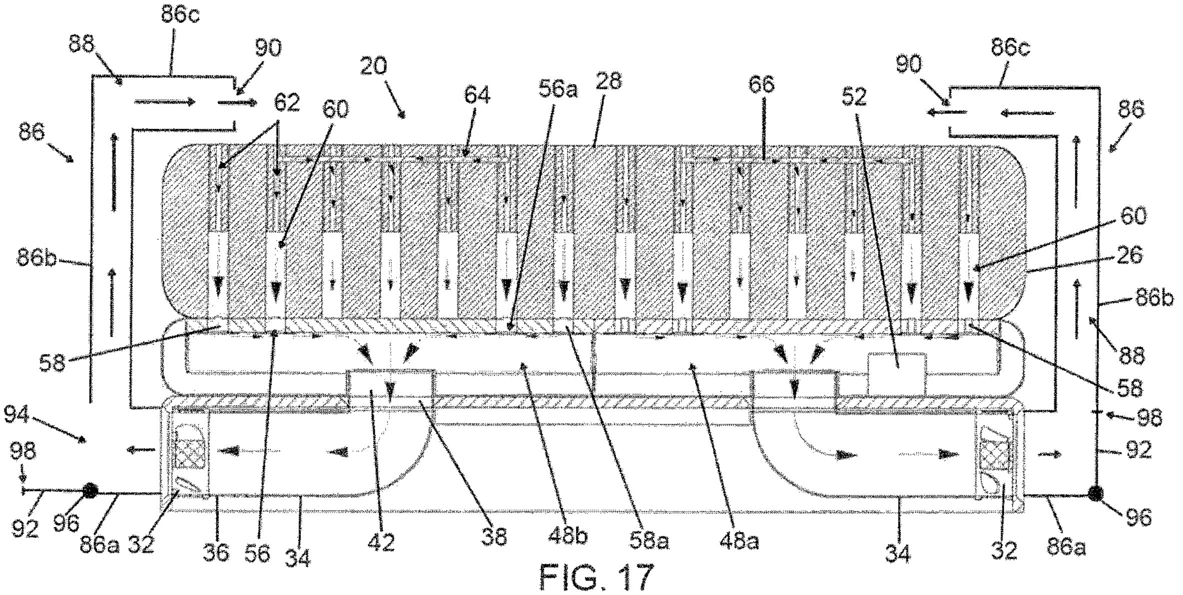
FIG. 17 is a cross-sectional view of components of one embodiment of the system shown in FIG. 1.

In one embodiment, shown in FIGS. 16 and 16A, third portion 86*c* of airflow post 86 includes an opening 90 that extends parallel to sleep surface 28 such that fan 32 will blow conditioned air out of fan box layer 22 and into first portion 86*a*. The conditioned air will move from first portion 86*a* and into second portion 86*b*. The conditioned air will move from second portion 86 and into third portion 86*c*, where it will exit third portion 86 through opening 90 such that the conditioned air moves parallel to sleep surface 28, as shown in FIGS. 16 and 16A. In one embodiment, shown in FIG. 17, opening 90 of airflow post 86 extends perpendicular to sleep surface 28 such that conditioned air within airflow post 86 will exit opening 90 in a direction that is perpendicular to sleep surface 28. In one embodiment, third portion 86*c* is rotatable relative to second portion 86*b* so as to adjust the direction of the air flow in a plane defined by third portion 86*c*. As shown in FIGS. 16-17, second portion 86*b* has a height that allows third portion 86*b* to be positioned above sleep surface 28. This allows the conditioned air to move over sleep surface 28. As shown in FIGS. 16-17, third portion 86 has a length that allows third portion 86 to extend over at least a portion of mattress layer 26 such that conditioned air is directed toward the center of mattress layer 26, rather than to a perimeter of mattress layer 26.

In one embodiment, shown in FIGS. 16-19, airflow posts 86 include features to allow conditioned air from fans 32 to be to be directed either adjacent to sleep surface 28 or into the area surrounding bedding system 20, depending upon the preference of a sleeper. For example, second portions 86*b* of air flow posts 86 can include a flap 92 that is movable between a closed position, shown in FIG. 16, to an open position, shown in FIG. 17. As flap 92 moves from the closed position to the open position, flap 92 exposes opening 94 shown in FIG. 17 such that fans 32 can move conditioned air through opening 94 in a direction that is parallel to sleep surface 28 such that the conditioned air moves into the area surrounding bedding system 20, where it will adjust the temperature in such area until the temperature in the room matches the selected temperature. In one embodiment, flap 92 moves between the open and closed positions by rotating or pivoting flap 92 about a hinge 96. In one embodiment, flap 92 includes a latch or tab 98 configured to maintain flap 92 in the closed position. It is envisioned that flaps 92 of some airflow posts 86 may be in the closed position while other flaps of other airflow posts 86 may be in the open position, as shown in FIG. 17. This allows the conditioned air to be directed adjacent to sleep surface 28 and into the area surrounding bedding system 20 simultaneously.

Figure 18:
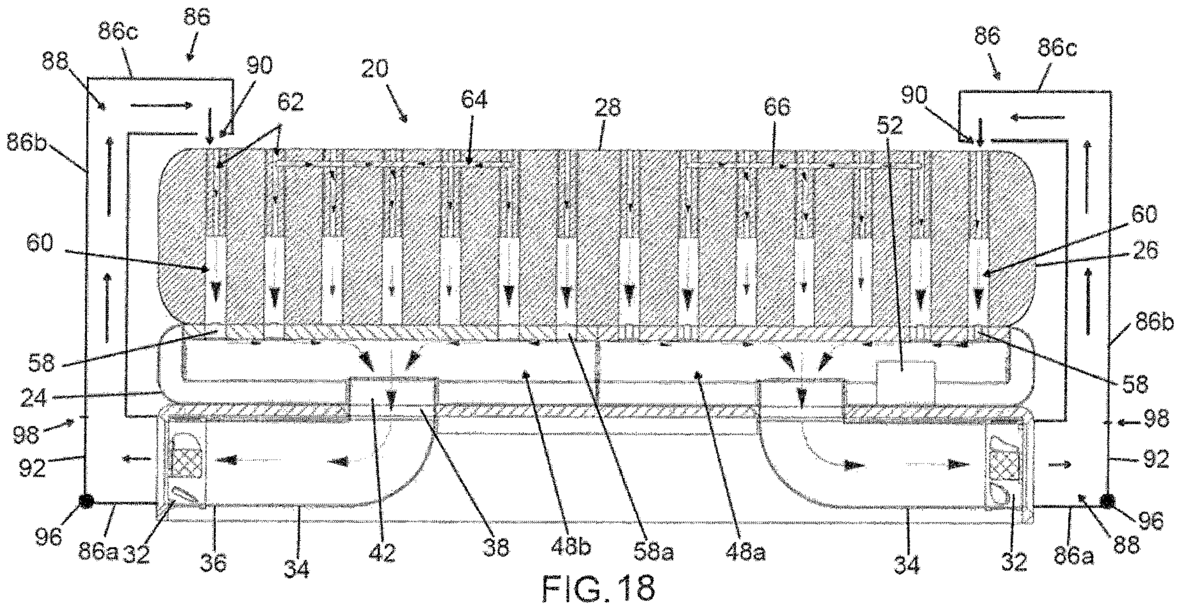
FIG. 18 is a cross-sectional view of components of one embodiment of the system shown in FIG. 1.
Figure 19:
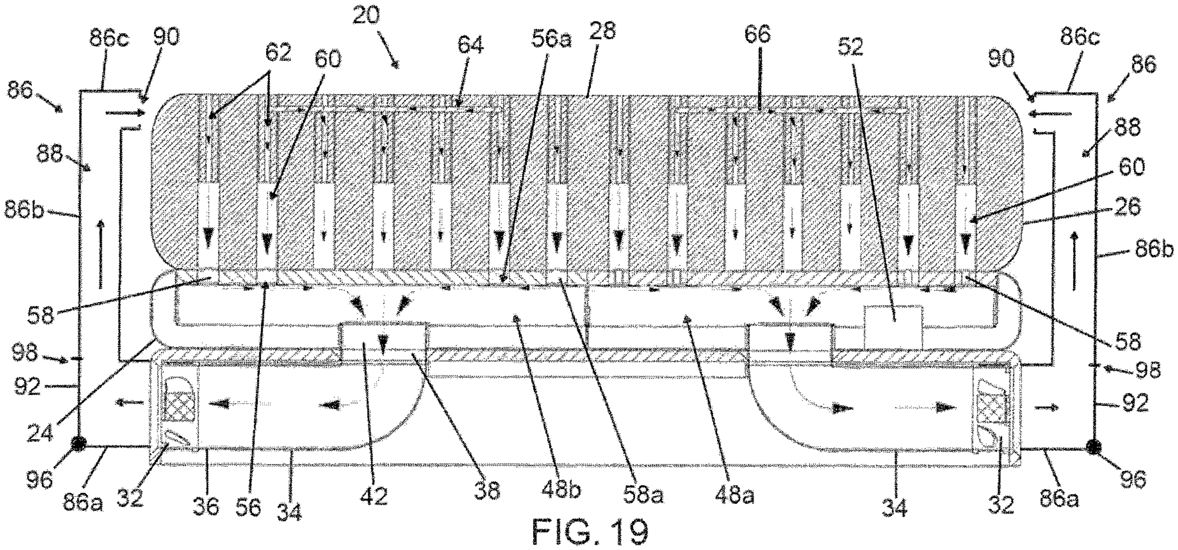
FIG. 19 is a cross-sectional view of components of one embodiment of the system shown in FIG. 1.

In one embodiment, shown in FIG. 19, second portion 86*b* of airflow post 86 has a reduced length compared to that shown in FIGS. 16-18. The reduced length of second portion 86*b* allows third portion 86*c* to be positioned such that opening 90 of airflow post 86 directs conditioned air to a portion of mattress layer 26 between sleep surface 28 of mattress layer 26 and an opposite bottom surface of mattress layer 26, as shown in FIG. 19. Third portion 86*c* of airflow post 86 also has a reduced length compared to that shown in FIGS. 16 and 16A such that third portion 86 can be positioned to the side of mattress layer 26, as opposed to over mattress layer 26. In one embodiment, second portion 86*b* of airflow post 86 is telescopic such that the length of second portion 86*b* can be reduced or increased axially, depending upon preference. For example, if a sleeper desires that conditioned air be directed above sleep surface 28, the sleeper can adjust the height of second portion 86*b* such that third portion 86*c* is positioned above sleep surface 28, as shown in FIGS. 16-18. Should the sleeper desire that conditioned air be directed below sleep surface 28, the sleeper can adjust the height of second portion 86*b* such that third portion 86*c* and/or opening 90 is positioned below sleep surface 28, as shown in FIG. 19.

It will be understood that various modifications may be made to the embodiments disclosed herein. For example, features of any one embodiment can be combined with features of any other embodiment. Therefore, the above description should not be construed as limiting, but merely as exemplification of the various embodiments. Those skilled in the art will envision other modifications within the scope and spirit of the claims appended hereto.

What is claimed is:

1. A bedding system comprising:

a base comprising a lower wall and a vertical wall connected to the lower wall, the lower wall comprising at least one opening;

first and second pressure generators coupled to the base such that the pressure generators do not extend outwardly from the vertical wall;

a spacer positioned over the base, the spacer defining a cavity, the pressure generators being connected to and extending from the lower wall of the base to an underside of the spacer;

a topper positioned over the spacer;

a first duct including a first end that is in communication with the first pressure generator and a second end that is in communication with the cavity; and a second duct including a first end that is in communication with the second pressure generator and a second end that is in communication with the cavity, wherein the spacer comprises opposite top and bottom walls and a side wall extending from the top wall to the bottom wall, the top wall being permeable, the bottom wall and the side wall being configured to limit air flow therethrough such that the bottom wall and the side wall direct air flow vertically through the bedding system along the topper and a pathway defined by the pressure generators.

2. The bedding system recited in claim 1, wherein the first pressure generator is positioned within the first end of the first duct and the second pressure generator is positioned within the first end of the second duct.

3. The bedding system recited in claim 1, wherein a portion of the bottom wall limits air flow therethrough.

4. The bedding system recited in claim 1, wherein the pressure generators are fans, the first pressure generator being positioned entirely within the first duct, the second pressure generator being positioned entirely within the second duct.

5. The bedding system recited in claim 1, wherein the topper is perforated for airflow therethrough.

6. The bedding system recited in claim 5, wherein the topper is made from foam.

7. The bedding system recited in claim 1, wherein the topper includes a plurality of spaced apart channels that each extend completely through a thickness of the topper.

8. The bedding system recited in claim 1, wherein the pressure generators are configured to create negative pressure and positive pressure.

9. A bedding system comprising:

a base comprising a lower wall and a vertical wall connected to the lower wall, the lower wall comprising a plurality of openings;

first and second pressure generators coupled to the base such that the pressure generators do not extend outwardly from the vertical wall;

a spacer positioned over the base, the spacer defining a cavity, the pressure generators being connected to and extending from the lower wall of the base to an underside of the spacer;

a topper positioned over the spacer;

a first duct including a first end that is in communication with the first pressure generator and a second end that is in communication with the cavity; and a second duct including a first end that is in communication with the second pressure generator and a second end that is in communication with the cavity, wherein the spacer comprises opposite top and bottom walls and a side wall extending from the top wall to the bottom wall, the top wall being permeable, the bottom wall and the side wall being configured to limit air flow therethrough such that the bottom wall and the side wall direct air flow vertically through the bedding system along the topper and a pathway defined by the pressure generators.

10. The bedding system recited in claim 9, wherein the pressure generators are fans, the first pressure generator being positioned entirely within the first duct, the second pressure generator being positioned entirely within the second duct.

11. The bedding system recited in claim 9, wherein the topper is perforated for airflow therethrough.

12. The bedding system recited in claim 11, wherein the topper is made from foam.

13. The bedding system recited in claim 12, wherein the pressure generators are fans, the first pressure generator being positioned entirely within the first duct, the second pressure generator being positioned entirely within the second duct.

14. The bedding system recited in claim 12, wherein the topper is perforated for airflow therethrough.

15. The bedding system recited in claim 14, wherein the topper is made from foam.

16. The bedding system recited in claim 9, wherein the topper includes a plurality of spaced apart channels that each extend completely through a thickness of the topper.

17. The bedding system recited in claim 9, wherein the pressure generators are configured to create negative pressure and positive pressure.

18. A bedding system comprising:

a base comprising a lower wall and a vertical wall connected to the lower wall, the lower wall comprising a plurality of spaced apart openings;

first and second pressure generators coupled to the base such that the pressure generators do not extend outwardly from the vertical wall;

a spacer positioned over the base, the spacer defining a cavity, the pressure generators being connected to and extending from the lower wall of the base to an underside of the spacer;

a topper positioned over the spacer;

a first duct including a first end that is in communication with the first pressure generator and a second end that is in communication with the cavity; and a second duct including a first end that is in communication with the second pressure generator and a second end that is in communication with the cavity, wherein the spacer comprises opposite top and bottom walls and a side wall extending from the top wall to the bottom wall, the top wall being permeable, the side wall and the bottom wall each being configured to limit air flow therethrough such that the bottom wall and the side wall direct air flow vertically through the bedding system along the topper and a pathway defined by the pressure generators.

19. The bedding system recited in claim 18, wherein the topper includes a plurality of spaced apart channels that each extend completely through a thickness of the topper.

20. The bedding system recited in claim 18, wherein the pressure generators are configured to create negative pressure and positive pressure.

* * * * *